Patented May 29, 1945

2,377,016

UNITED STATES PATENT OFFICE 2,377,016

PREPARATION OF SODIUM HEPARINATE

Marvin H. Kuizenga, Kalamazoo, Mich., assignor to The Upjohn Company, Kalamazoo, Mich., a corporation of Michigan No Drawing. Application December 9, 1943, Serial No. 513,624

10 Claims. (Cl. 260—210)

The present invention is directed to a method for the preparation of sodium heparinate and is particularly concerned with the preparation of sodium heparinate from crude barium heparinate.

The preparation of crude heparin ordinarily is accomplished by the autolysis of animal tissue and the subsequent extraction and purification of the autolysate. A representative description of such an operation is that set forth by A. F. Charles and D. A. Scott in Transactions of the Royal Society of Canada, Section 5, 1934, pages 55-58. The crude heparin product as obtained according to such procedure is customarily purified and frequently employed as the sodium salt. In the manipulation of the heparin product to form the sodium salt, it has been suggested to pass from the crude heparin to an intermediate barium salt which, by reason of its solubility characteristics and ease of formation may be purified as by fractional crystallization, clarification, etc. Also, this compound is readily reacted upon to form the more soluble sodium salt of heparin by double decomposition with a sodium carbonate, sulfate, or other inorganic salt adapted to form concurrently an insoluble barium carbonate, sulfate, etc. Existing procedures, however, have not been entirely satisfactory in that the sodium heparinate so obtained has not been characterized by a high degree of activity, necessitating the use in pharmaceutical application of comparatively large amounts to obtain desired physiological reactions.

It is an object of the present invention to provide an improved procedure for the preparation of sodium heparinate from barium heparinate. A further object is to provide a one-step method yielding a sodium heparinate having a higher anti-coagulant effectiveness in terms of assay units per milligram than has hitherto characterized sodium heparinate preparations. It is a still further object to supply such improved sodium heparinate in relatively high yields from barium heparinate. Other objects of the invention will become apparent from the following descriptive matter and claims.

According to the present invention it has been discovered that a sodium heparinate of high potency and purity may be obtained in good yield from crude barium heparinate solutions by the double decomposition of the barium heparinate with a reagent containing an excess of sodium ions and negative ions forming with barium a water-insoluble barium compound, and the fractional precipitation of the resulting sodium heparinate solution. The reagent employed in accomplishing the fractional precipitation is acetone or a mixture of acetone and a sodium salt, preferably sodium chloride. The exact procedure employed to obtain sodium heparinate of the highest potency has been found to be critical, particularly with respect to the proportions of acetone employed in the several steps.

In carrying out the invention, a preliminary operation may comprise treating crude heparin with ammonium hydroxide and water-soluble barium salt to prepare an aqueous solution of barium heparinate. Any suitable crude barium heparinate product may be employed, however. The aqueous barium heparinate is reacted with an alkaline reagent comprising at least a slight excess of sodium ions over that theoretically required to produce the corresponding sodium heparinate, and negative ions to form with the barium a water-insoluble barium compound. This particular step is carried out under moderately alkaline conditions. The resulting precipitate of water-insoluble inorganic barium salt, e.g. barium carbonate, barium sulfate, barium oxalate, etc., may be filtered from the mixture if desired. However, this precipitate is sometimes advantageously retained in the mixture to serve as a filter aid in a subsequent filtration operation wherein a light gummy precipitate is ordinarily encountered. In any event, and whether or not the barium salt is removed, the aqueous solution is then diluted with acetone in amount to give in the ultimate mixture an acetone content of from about 22.5 to 27.5 per cent by volume. In this operation an inorganic sodium salt, such as sodium chloride, may be employed to act as a salting out agent, although not necessarily. Also, the pH of the mixture may be adjusted to approximately 8.0 at this point, although generally the mixture as obtained from the double decomposition operation has an alkalinity falling within the operable pH range of from about 7.5 to 9.0. The mixture comprising the sodium heparinate, water, acetone, and, at option, the precipitated inorganic barium salt and dissolved sodium salt, is then cooled and allowed to stand for a period of time. The optimum temperature of cooling and standing is at below 10° C. This step causes precipitation of traces of dissolved barium salts and of organic inactive contaminants which have been found to be of relatively low anti-coagulant effectiveness. The mixture is filtered or centrifuged while cold and the filtrate or centrifugate diluted with additional acetone so as to precipitate the desired highly effective sodium heparinate. While any amount of additional acetone gives some yield of the desired sodium heparinate, maximum yields and a product of optimum effectiveness are obtained when the amount of acetone here employed is, in combination with that originally introduced into the mixture, sufficient to form from 38 to 46 per cent by volume of the final liquid dispersion. The absolute optimum of acetone content is between 40 and 43 per cent by volume. The resultant precipitated sodium heparinate may be separated in any suitable fashion.

In order to obtain as high a yield as possible of this reactive fraction, the mixture may be stored, as in a refrigerator, for a period of time and thereafter filtered, centrifuged, or decanted as convenient. The filtrate or centrifugate from the latter operation contains additional sodium heparinate product, a high percentage of which may be recovered by the addition of still more acetone thereto. Such residual product, however, has been found to be of relatively low activity and not adapted for manipulation by further purification operations to obtain a desirable pharmaceutical material.

The following example illustrates a preferred mode of operation, but is not to be construed as limiting the invention. It is to be understood that the amounts and proportions set forth therein are considered as optimum, but that the entire range of proportions as set forth in the foregoing paragraphs are entirely operable in obtaining a satisfactory product.

*Example*

Crude heparin as obtained from the autolysis of beef lung and extraction and purification of the autolysate was reacted with aqueous ammonium hydroxide and thereafter with barium chloride to form barium heparinate. The resulting solution was diluted with acetic acid to about 35 per cent of acetic acid in the ultimate solution, to precipitate the barium salt of heparin. This product was separated and 50 grams thereof dissolved in 2500 milliliters of water. Sufficient saturated sodium carbonate solution was added to the mixture to give a pH of 9.0, the mixture heated to 65° C., and allowed to stand for approximately 15 hours. Precipitated barium carbonate was then removed by centrifuging. The pH of the centrifugate was adjusted to 8.0 with dilute sulfuric acid, and 0.9 per cent of sodium chloride was dissolved therein. Sufficient acetone was then added to the mixture to give 25 per cent by volume of acetone in the ultimate mixture. The resulting solution was cooled to 5° C. for 15 hours whereupon a light precipitate formed. This precipitate was removed by centrifuging and found to be substantially inactive as regards anti-coagulant properties. This product consisted principally of barium carbonate, tarry material, and a small proportion of sodium heparinate. The clear centrifugate was further diluted with sufficient acetone to give in combination with the original acetone 40 per cent acetone by volume in the final mixture. Sodium heparinate immediately precipitated from solution. The mixture was allowed to stand for 24 hours and thereafter centrifuged to recover 26 grams of sodium heparinate (air-dried) assaying 125 units per milligram.

The residual liquid from this operation was further processed in an effort to recover additional sodium heparinate. This was accomplished by adding enough more acetone to give a total of 65 per cent by volume. The resulting precipitate was separated and dried exactly as in the operation previously described. This product amounted to 16.5 grams of sodium heparinate material having an activity of only 45 units per milligram. Efforts were made to rework this product by again forming the barium salt therefrom and conducting a further fractionation by successive precipitations from 40 per cent and from 65 per cent acetone solutions. From the 40 per cent acetone mixture only 0.05 gram of material was obtained. This product had an activity of 30 units per milligram. From the 65 per cent acetone solution 10.5 grams of product was recovered having an activity of 65 units per milligram. It was concluded that the product recovered subsequent to the primary precipitation operation was not well adapted for use in the preparation of a pharmaceutical product of high effectiveness.

While the foregoing example has been particularly concerned with the processing of crude heparin as obtained from beef lung, other crude heparin or barium heparinate products, whether obtained by autolysis of beef lever, beef muscle, other animal tissue, or of whatever source, may be similarly employed. Also, this fractional precipitation procedure may be found valuable in the preparation of other alkali metal and alkaline earth metal heparin salts of high effectiveness in preventing the coagulation of blood. A concurrently filed application, Serial No. 513,623 describes a preferred procedure for the extraction from animal tissue of a crude heparin adapted to be employed in accordance with the present invention.

I claim:

1. In a method for the preparation of sodium heparinate, the steps of preparing an aqueous solution of crude barium heparinate, reacting the barium heparinate with an alkaline reagent containing an excess of sodium ions and negative ions forming with barium a water-insoluble barium compound, diluting the mixture with acetone in the amount of from 22.5 to 27.5 per cent by volume of the ultimate mixture, cooling the mixture, filtering the mixture cold, diluting the filtrate with additional acetone, and separating the resultant precipitate of sodium heparinate.

2. In a method for the preparation of sodium heparinate, the steps of preparing an aqueous solution of crude barium heparinate, reacting the barium heparinate with an alkaline reagent containing an excess of sodium ions and negative ions forming with barium a water-insoluble barium compound, filtering to remove the precipitated barium compound, diluting the filtrate with acetone in the amount of from 22.5 to 27.5 per cent by volume of the ultimate mixture, cooling the mixture, filtering the mixture cold, diluting the filtrate with additional acetone, and separating the resultant precipitate of sodium heparinate.

3. In a method for the preparation of sodium heparinate, the steps of preparing an aqueous solution of crude barium heparinate, reacting the barium heparinate with an alkaline reagent containing an excess of sodium ions and negative ions forming with barium a water-insoluble barium compound, filtering to remove the precipitated barium compound, diluting the filtrate with acetone in the amount of from 22.5 to 27.5 per cent by volume of the ultimate mixture, cooling the mixture to below 10° C., filtering the mixture cold, diluting the filtrate with additional acetone, and separating the resultant precipitate of sodium heparinate.

4. In a method for the preparation of sodium heparinate, the steps of reacting an aqueous solution of crude barium heparinate with an alkaline reagent containing an excess of sodium ions and negative ions forming with barium a water-insoluble barium compound, adding to the mixture sodium chloride, diluting the mixture with acetone in the amount of from 22.5 to 27.5 per cent by volume of the ultimate mixture, cooling the mixture, filtering the mixture cold, diluting the filtrate with additional acetone, and separating the resultant precipitate of sodium heparinate.

5. In a method for the preparation of sodium heparinate, the steps of reacting an aqueous solution of crude barium heparinate with an alkaline reagent containing an excess of sodium ions and negative ions forming with barium a water-insoluble barium compound, adjusting the pH of the mixture to between 7.5 and 9.0, diluting the mixture with acetone in the amount of from 22.5 to 27.5 per cent by volume of the ultimate mixture, cooling the mixture, filtering the mixture cold, further diluting the filtrate with sufficient acetone to give a total of from 38 to 46 per cent of acetone by volume in the mixture, and separating the resultant precipitate of sodium heparinate.

6. In a method for the preparation of sodium heparinate, the steps of reacting an aqueous solution of crude barium heparinate with an alkaline reagent containing an excess of sodium ions and negative ions forming with barium a water-insoluble barium compound, diluting the mixture with acetone in the amount of from 22.5 to 27.5 per cent by volume of the ultimate mixture, cooling the mixture to below 10° C., filtering the mixture cold, further diluting the filtrate with sufficient acetone to give a total of from 38 to 46 per cent of acetone by volume in the mixture, and separating the resultant precipitate of sodium heparinate.

7. In a method for the preparation of sodium heparinate, the steps of preparing an aqueous solution of crude barium heparinate by reacting crude heparin from the autolysis of animal tissue with ammonium hydroxide and thereafter with a water-soluble inorganic barium salt, reacting the barium precipitate with an alkaline reagent containing an excess of sodium ions and negative ions forming with barium a water-insoluble barium compound, filtering to remove the precipitated barium compound, adding sodium chloride to the filtrate, diluting the filtrate with acetone in the amount of from 22.5 to 27.5 per cent by volume of the ultimate mixture, cooling the mixture to below 10° C., filtering the mixture cold, diluting the filtrate with sufficient additional acetone to give in the ultimate mixture from 38 to 46 per cent by volume of acetone, and separating the resultant precipitate of sodium heparinate.

8. In a method for the preparation of sodium heparinate, the steps of preparing an aqueous solution of crude barium heparinate by reacting crude heparin from the autolysis of beef lung with ammonium hydroxide and thereafter with barium chloride, reacting the barium heparinate with an alkaline reagent containing an excess of sodium ions and negative ions forming with barium a water-soluble barium compound, filtering to remove the precipitated barium compound, adding sodium chloride to the filtrate, diluting the filtrate with acetone in the amount of from 22.5 to 27.5 per cent by volume of ultimate mixture, cooling the mixture to below 10° C., filtering the mixture cold, diluting the filtrate with sufficient additional acetone to give in the ultimate mixture from 38 to 46 per cent by volume of acetone, and separarting the resultant precipitate of sodium heparinate.

9. In a method for the preparation of sodium heparinate, the steps of preparing an aqueous solution of crude barium heparinate, reacting the barium heparinate with sodium carbonate, diluting the mixture with acetone in the amount of from 22.5 to 27.5 per cent by volume of the ultimate mixture, cooling the mixture to below 10° C., filtering the mixture, diluting the filtrate with sufficient additional acetone to give in the ultimate mixture from 40 to 43 per cent by volume of acetone, and separating the resultant precipitate of sodium heparinate.

10. In a method for the preparation of sodium heparinate, the steps of preparing an aqueous solution of crude barium heparinate, reacting the barium heparinate with sodium carbonate, filtering to remove precipitated barium carbonate, adjusting the filtrate to a pH of about 8, diluting the filtrate with acetone in the amount of from 22.5 to 27.5 per cent by volume of the ultimate mixture, cooling the mixture to below 10° C., filtering the mixture cold, diluting the filtrate with sufficient additional acetone to give in the ultimate mixture from 38 to 46 per cent by volume of acetone, and separating the resultant precipitate of sodium heparinate.

MARVIN H. KUIZENGA.